US009602336B2

(12) United States Patent
Twiddy et al.

(10) Patent No.: US 9,602,336 B2
(45) Date of Patent: Mar. 21, 2017

(54) CONFIGURABLE NETWORK MANAGEMENT SYSTEM EVENT PROCESSING USING SIMPLE NETWORK MANAGEMENT TABLE INDICES

(71) Applicant: Cisco Technology, Inc., San Jose, CA (US)

(72) Inventors: Robert Twiddy, Raleigh, NC (US); Jacob VanMastrigt, Durham, NC (US); Cris Shupp, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/705,602

(22) Filed: May 6, 2015

(65) Prior Publication Data
US 2015/0236893 A1    Aug. 20, 2015

Related U.S. Application Data

(63) Continuation of application No. 12/962,446, filed on Dec. 7, 2010, now Pat. No. 9,059,895.
(Continued)

(51) Int. Cl.
*H04L 12/24* (2006.01)
*H04L 29/08* (2006.01)

(52) U.S. Cl.
CPC .............. *H04L 41/06* (2013.01); *H04L 67/02* (2013.01)

(58) Field of Classification Search
None
See application file for complete search history.

(56) References Cited

U.S. PATENT DOCUMENTS 5,745,897 A * 4/1998 Perkins ............... H04L 41/0213
5,864,865 A * 1/1999 Lakis ................. H04L 41/0213
(Continued)

OTHER PUBLICATIONS

Chisholm S. et al., "Entity State MIB," Internet Engineering Task Force (IETF) Network Working Group Request for Comments (RFC) 4268, published in United States, Nov. 2005, 19 pages.
(Continued)

*Primary Examiner* — Farid Homayounmehr
*Assistant Examiner* — Henry Tsang
(74) *Attorney, Agent, or Firm* — Hickman Palermo Becker Bingham LLP

(57) ABSTRACT

In an embodiment, a computer-implemented method, comprises receiving a simple network management protocol (SNMP) management information base (MIB) definition file; identifying in the MIB definition file one or more SNMP notification varbinds and associated notification varbind information; storing in a compiled MIB file for each of the varbinds: notification varbind info and columnar index info; causing generating a user interface having values based on the compiled MIB file; receiving user input selecting values and setting one or more network management system (NMS) event descriptions or event correlation rules; creating a NMS configuration file that is configured to cause the NMS at runtime to include and use the event descriptions or event correlation rules, and the compiled MIB file, in SNMP notification configuration or event correlation functions of the network management logic. As a result, descriptive data relating to SNMP notification columnar objects becomes available for use in graphical user interface data display panels in event descriptions and in event correlation rules and processes without users or administrators having to learn a special language or API or use a special NMS configuration file format.

20 Claims, 6 Drawing Sheets

Related U.S. Application Data

(60) Provisional application No. 61/267,709, filed on Dec. 8, 2009.

(56) References Cited

U.S. PATENT DOCUMENTS

| | | | |
|---|---|---|---|
| 6,181,776 B1 | 1/2001 | Crossley et al. | |
| 6,253,243 B1 | 6/2001 | Spencer | |
| 6,990,518 B1 | 1/2006 | Secer | |
| 7,254,781 B1* | 8/2007 | Land | H04L 12/2856 715/760 |
| 2002/0161935 A1* | 10/2002 | Blaisdell | H04L 41/0213 719/331 |
| 2004/0160464 A1* | 8/2004 | Reyna | G06F 8/34 715/854 |
| 2005/0166099 A1* | 7/2005 | Shyu | G06F 11/0709 714/47.1 |
| 2007/0011282 A1* | 1/2007 | Alex | G06F 17/30575 709/220 |
| 2007/0208842 A1 | 9/2007 | Jeghers | |
| 2008/0133765 A1* | 6/2008 | Porel | H04L 41/0213 709/230 |
| 2009/0198549 A1* | 8/2009 | Kearns | G06Q 10/0631 705/7.12 |
| 2012/0117109 A1 | 5/2012 | Bauernfeind et al. | |

OTHER PUBLICATIONS

Case J. et al., "Structure of Management Information for Verizon 2 of the Simple Network Management Protocol (SNMPv2)," IETF Network Working Group RFC 1902, Jan. 1996, 40 pages.
Bierman A. et al., "Entity Sensor Management Information Base", IETF Network Working Group RFC 3433, Dec. 2002, 18 pages.
Anonymous, "Event Variables—where are they documented?", series of postings in Discussion Group, Vivit, published in United States, Jun. 8, 2007, 3 pages.
U.S. Appl. No. 12/962,446, filed Dec. 7, 2010, Final Office Action, Feb. 3, 2014.
U.S. Appl. No. 12/962,446, filed Dec. 7, 2010, Office Action, Sep. 30, 2015.
U.S. Appl. No. 12/962,446, filed Dec. 7, 2010, Notice of Allowance, Feb. 9, 2015.

* cited by examiner

CONFIGURABLE NETWORK MANAGEMENT SYSTEM EVENT PROCESSING USING SIMPLE NETWORK MANAGEMENT TABLE INDICES

BENEFIT CLAIM

This application claims the benefit under 35 U.S.C. §120 as a Continuation of application Ser. No. 12/962,446, filed Dec. 7, 2010, which claims the benefit under 35 USC 119(e) of provisional application 61/267,709, filed Dec. 8, 2009, the entire contents of which are hereby incorporated by reference for all purposes as if fully set forth herein. The applicant hereby rescinds any disclaimer of claim scope in the parent applications or the prosecution history thereof and advises the USPTO that the claims in this application may be broader than any claim in the parent applications.

TECHNICAL FIELD

The present disclosure generally relates to managing computer networks. The disclosure relates more specifically to accessing and using simple network management protocol (SNMP) encoded notification varbind index values in network management operations.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Networking devices such as routers, switches and gateways may experience events during operation. Examples of events include exceptions, threshold crossings, and notifications of changed behavior. Network management systems (NMS) report noteworthy events to the NMS user. When events are reported using SNMP (Simple Network Management Protocol) Notifications, the NMS must be capable of displaying certain detailed information to the user, this is typically performed by creating a NMS event object which is presented to the NMS user via some type of event log. The NMS also must be able to use detailed sets of information to correlate various "onset" and "abate" types of events, leaving only the last or most severe event in the "active" event log. The events cleared by such correlation are typically counted, or sent to some type of event history log for archive purposes. In addition to correlating matching "onset" and "abate" types of events, it may also be necessary to correlate multiple other types of events, in the case where they represent the same issue, so that only the most meaningful or severe event is presented to the user.

SNMP provides two basic types of objects for use in notifications, columnar and scalar objects. As described in Request for Comments (RFC) 1902 published by The Internet Society, such as in section 7.1.12 and 7.7 of RFC 1902, objects stored in a virtual table are termed columnar objects. In practice, and in this document, objects not found in a virtual table are termed scalar objects. Various specific SNMP Management Information Base (MIB) specification files define virtual tables, the ordered list of table indices, and columnar & scalar objects (including index objects). In addition to a textual name for each object, the MIB also defines an Object Identifier (OID), which is a notation describing the traversal of a hierarchical "naming" tree structure. SNMP object instances form the "leaves" on the naming tree. Therefore, a SNMP object instance may be referenced using an OID starting with a "naming" OID, which represents the object type, and ending with subtree information describing the "instance." SNMP scalar objects append ".0" to the end of the naming OID. SNMP columnar objects append the ordered set of table indices to the end of the naming OID. The SNMP standards define valid table index types, and the method to transform values of each index type into OID notation. The transformation method for encoding/decoding specific index values is dependant on index type, allowable length, and other information specified by the index object type details in a SNMP MIB. It is not possible to decode indices from an object's OID without this specific knowledge from the MIB definition.

In practice, software applications parse required information from structured SNMP MIB files using a MIB compiler. The output of MIB compilation is typically some combination of (1) configuration: one or more files of standard or propritary data file format, (2) code: one or more source code files, such as stubbed-out procedures, to be customized later. There are many tradeoffs between these two methods. In addition to system performance, one of the more important considerations is the cost of iteratively adding support for new MIB files and distributing this support to existing installations. This cost can be significantly higher if support is added and tested by a $3^{rd}$ party vendor (not the NMS vendor). Compiling MIB information into a data file allows for an event rule management application, such as discussed below, to create and manage application behavior based on MIB details. Regardless of the method used, the purpose of MIB compiling is to inject MIB details into software application behavior. Once the MIB has been compiled, and the corresponding software application behavior rules are written, the software application can be used.

In the typical event correlation case, onset/abate traps share the same varbind object instance, so event correlation may use the entire OID (naming OID and index values). However, in cases where two SNMP notifications do not share the same varbind object instance, it is often necessary for a NMS to parse and decode the value of one or more indices, from the columnar varbind OID.

DETAILED DESCRIPTION

Figure 1:
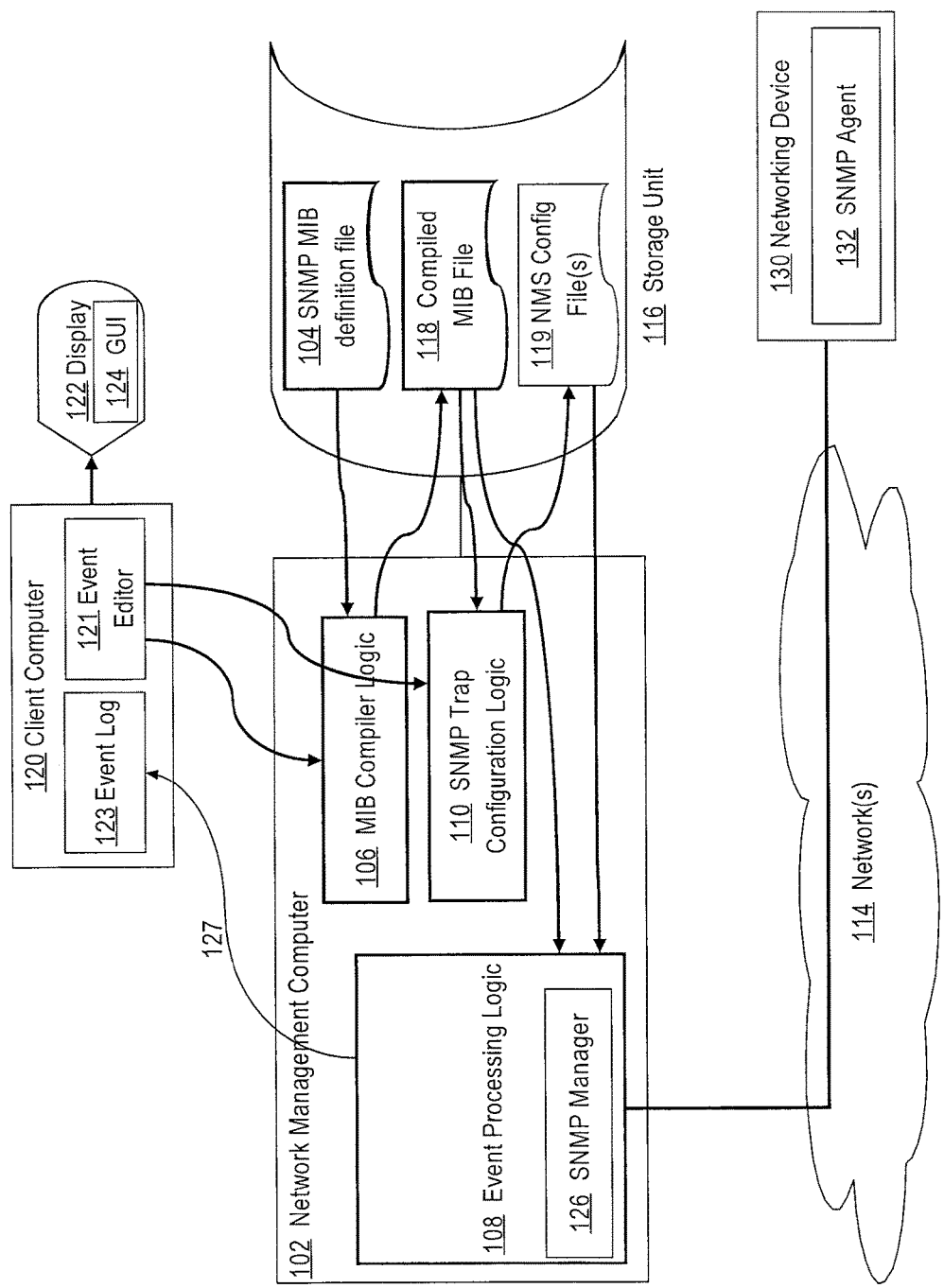
FIG. 1 illustrates a network management system and related logic.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
2.1 Encoded Varbind Index Values
2.2 Using Decoded Varbind Index Values in NMS Event Descriptions
2.3 Using Decoded Varbind Index Values for NMS Event Correlation
3.0 Implementation Mechanisms—Hardware Overview
4.0 Extensions and Alternatives 1.0 General Overview In an embodiment, a computer-implemented method, comprises receiving a simple network management protocol (SNMP) management information base (MIB) definition file; identifying in the MIB definition file one or more SNMP notification varbinds and associated notification varbind information; storing in a compiled MIB file for each of the varbinds: notification varbind info and columnar index info; causing generating a user interface having values based on the compiled MIB file; receiving user input selecting values and setting one or more network management system (NMS) event descriptions or event correlation rules; creating a NMS configuration file that is configured to cause the NMS at runtime to include and use the event descriptions or event correlation rules, and the compiled MIB file, in SNMP notification configuration or event correlation functions of the network management logic.

In an embodiment, a computer-implemented method comprises:

(1) MIB Compilation: receiving a simple network management protocol (SNMP) management information base (MIB) definition file; identifying and storing the two main groups of information: (a) "notification varbind info": For each notification store an ordered list of varbinds. For each varbind store: object textual name, Object Identifier (OID), and etc. (b) "notification columnar index info": For each columnar varbind, also store an ordered list of table indices. For each index store: index textual name, index type, index allowed length (to determine fixed length or not), index "implied" encoding.

(2) NMS Configuration: creating network management logic rules which govern NMS behavior at runtime. These rules are used upon receiving certain SNMP Notifications, and control the resulting NMS Event descriptions and/or Event Correlation. The rules allow referencing each varbind index via the (a) columnar varbind object's textual name coupled with (b) the virtual table's index textual name.

(3) Runtime: When receiving a SNMP notification during network management operations, (a) parse each table index from the varbind OID, (b) convert each resulting index value into the proper type defined in the MIB, and (c) use the resulting value when evaluating the NMS Event rule logic. As a result, descriptive data relating to SNMP notification columnar objects, which has been unavailable in past approaches, becomes available for use in graphical user interface data display panels in event descriptions and in event correlation rules and processes. Further, varbind instance information variables may be used for notification-event filter criteria.

In an embodiment, the storing comprises storing in the compiled MIB file information specific to each columnar varbind instance information including a name, type, allowed length, and implied encoding. In an embodiment, creating network management logic comprises creating a stored list of event short descriptions or event names in association with an event editor and based on the instance information in the compiled MIB file. In an embodiment, creating network management logic comprises creating and storing one or more event correlation rules comprising specific indices of one or more varbinds. The use of an event editor is not required in all embodiments; in some embodiments a configuration file may be used to define event descriptions and correlations. In all embodiments, custom code is not required to define event descriptions or correlations, offering significant benefits over past practice. Thus, in embodiments, adding new NMS event types becomes far easier and can be accomplished by performing or repeating certain compilation and configuration steps as described herein, in which event descriptions and/or event correlation tags are created, plus certain additional configuration information, after which an NMS reads the updated configuration files. In certain embodiments an event editor may facilitate data entry for compilation and configuration.

In an embodiment, the method further comprises receiving definitions of one or more new SNMP notification types in an SNMP MIB or receiving new network management event types, and in response thereto, repeating the steps of receiving, identifying, storing, and creating with respect to the new SNMP notification types or new network management event types.

In an embodiment, the method further comprises receiving first user input defining a new SNMP notification type or a new network management event type; receiving second user input identifying a second MIB definition file that describes the new SNMP notification type or the new network management event type; repeating the steps of reading and storing using the second MIB definition file, wherein the storing is performed using an updated compiled MIB file; creating and storing updated network management logic that is configured to include and use the updated compiled MIB file in SNMP notification configuration functions of the updated network management logic.

In an embodiment, a computer-implemented method comprises network management logic receiving a simple network management protocol (SNMP) management information base (MIB) compiled MIB file that stores, notification varbind info and columnar index info. The network management logic generating and causing to be displayed on a display unit of a computer, a graphical user interface configured to receive user input to configure descriptions of network management event descriptions; the network management logic generating and causing to be displayed on the display unit, a first user interface widget configured to receive first user input selecting an event description function; the network management logic receiving second user input requesting displaying available objects index values; in response to the second user input, the network management logic reading the compiled MIB file and displaying on the display unit in association with the first user interface widget a list of decoded values of the table indexes.

In an embodiment, such a process may include using an Event Editor to configure a NMS with event descriptions prior to using decoded data in active network management processing of received notifications. The compiled MIB file comprises input and for any NMS event a user may configure the description that the NMS shows for that NMS event. As output, a NMS notification configuration file is created and stored. Zero or more index names from any varbind of the related SNMP notification may be selected from a list presented in a GUI widget to be part of a NMS event description. After completion of such configuration of the NMS, at runtime of the NMS, the index name is replaced with the decoded index value from a received SNMP notification.

In an embodiment, the method further comprises the network management logic generating and causing to be displayed on the display unit, a second user interface widget configured to receive third user input requesting configuring one or more event correlation rules; the network management logic receiving fourth user input requesting displaying available object index values for use within one of the rules; in response to the fourth user input, the network management logic reading the compiled MIB file and displaying on the display unit in association with the second interface widget a list of decoded values of the table indexes.

In an embodiment, such a process may include using an Event Editor to configure a NMS with event correlation rules prior to using decoded data in active network management processing of received notifications. The compiled MIB file comprises input and for any NMS event correlation rule a user may configure the names of variables that the NMS uses to process that rule. As output, a NMS notification configuration file is created and stored. Zero or more index names from any varbind of the related SNMP notification may be selected from a list presented in a GUI widget to be part of a NMS event correlation rule. After completion of such configuration of the NMS, at runtime of the NMS, the index name is replaced with the decoded index value from a received SNMP notification and used for correlation with existing NMS events or correlation with NMS events that are received in the future.

In other embodiments, the invention encompasses a computer apparatus and a computer-readable medium configured to carry out the foregoing steps.

2.0 Structural and Functional Overview 2.1 Encoded Varbind Index Values

SNMP provides two basic types of objects for data in a notification, termed columnar or scalar objects. Either type of object may be included in a SNMP Notification as variable binding data ("varbind"). SNMP Management Information Base (MIB) specification files contain information about various defined objects and object attributes. The MIB provides both a textual name of the object, as well as an Object Identifier (OID). Scalar objects append ".0" to the end of the naming OID, while columnar objects encode and append the value of each table index, in order, to the end of the naming OID.

SNMP defines encoding methods for six (6) types of Indexes, as stated in Request for Comments (RFC) 1902 of the Internet Engineering Task Force (IETF), sec 7.7. Some of the index types have variable length. There is more than one way that variable length indices can be encoded, and the MIB provides specific information on which index encoding method to use (see "implied"). There is no way to decode a columnar objects indices without specific MIB knowledge regarding index type, whether the index is a variable or fixed length, and whether the index is "IMPLIED" or not.

A NMS typically stores a list of supported object name OIDs (total OID minus the instance information). Therefore, the NMS can parse all instance information from the OID received in a SNMP Notification, by removing the "name" portion of the OID. However, parsing and decoding each table index is significantly more difficult, since much more detailed MIB information, for each index, is required. Detailed MIB information is often not stored in a readily available manner, since it is only needed for a very small percentage of cases. Two such cases, which require decoding individual columnar object indices, are discussed below.

Generally, table index information is not available to applications. In particular, MIB files normally specify table index information with the "MAX-ACCESS" value as "not-accessible" (RFC1902 sec 7.7, bottom, two exceptions are provided), meaning that a specific object functioning as part of the table index is only available as encoded in an accessible columnar object name/OID 2.2 Using Decoded Varbind Index Values in NMS Event Descriptions SNMP tables commonly use an index comprised of one or more 32-bit, Integer-based objects such as Integer32, Counter32, or Gauge32 objects. Integer-based indices can be appended to the object name OID as another sub-ID, have fixed length, and are human readable. Strings and OIDs are index types that require maintaining length and IMPLIED MIB status, and these index types are not often used. Fixed and variable length string index types are not human readable. Due to the effort of decoding varbind indices, and the uncommon use of string and OID index types, many NMS only provide a way to view the encoded varbind indices. Many NMS provide a programmatic interface to manipulate event values, but this interface is generally only available to the NMS vendor. If a customized interface is provided to NMS user, then programming knowledge is required.

As an example, the SNMP MIB named CISCO-IP-LOCAL-POOL-MIB contains information about generic IP pools. Most of the information in this MIB is found in tables, and most of the tables are indexed based on the object cIpLocalPoolName, which is a variable length string (not "IMPLIED"). As an index, cIpLocalPoolName should have MAX-ACCESS=not-accessible. Thus, the objects in the associated SNMP Notifications contain the encoded pool name, and because the pool name is an index, it is available as an encoded index (i.e., part of a varbind OID, not as a varbind value).

According to RFC 1902, section 7.7, the 12-character string "mobilenodes4" is encoded as "12.109.111.98.105.108.101.110.111.100.101.115.52", and therefore an object such as "cIpLocalPoolStatFreeAddrs" (1.3.6.1.4.1.9.9.326.1.3.1.1.1) would use the OID: 1.3.6.1.4.1.9.9.326.1.3.1.1.1.12.109.111.98.105.108.101. 110.111.100.101.115.52 Since the value of cIpLocalPoolStatFreeAddrs is only available as an index, and not as a varbind value, some NMS cannot decode and display it to the user.

2.3 Using Decoded Varbind Index Values for NMS Event Correlation

An embodiment provides the ability to configure, via a GUI, event correlation tags, so that no programming is necessary. Since the columnar object instance information described in previous sections is gathered from the SNMP MIB definitions, it is possible to utilize this information in NMS Event correlation processes. The resulting NMS Event processing functionality is flexible, allowing:

(1) Correlation of two (or more) events using any columnar object instance value, from any columnar object type, from any SNMP Notification. For instance, if SNMP Notification type N1, columnar object type Cx includes 3 indices, index types Ia, Ib, and Ic; and SNMP Notification type N2, columnar object type Cy includes 2 indices Id, and Ie, then correlation can be performed using the index values of N1:Cx:Ib and N2:Cy:Ie.

(2) Correlation between a columnar object index value of one event type, and a columnar/non-columnar object value, or other SNMP notification protocol field values, from another event type.

(3) Correlation of any combination of multiple columnar object instances and/or columnar/non-columnar object values, and/or other SNMP notification protocol values and types may be used to calculate the correlation tag.

In simple cases, SNMP notifications such as linkUp/linkDown, can be correlated using a varbind unique to both messages. As the whole OID is used, containing the object name OID, and all index(es) encoded, decoding the indices is not necessary. Correlating matching onset/abate types of SNMP notifications, or correlating multiple instances of the same notification, often can be performed using this method. However, correlating similar notifications, attempting to calculate a "root cause", eliminating unnecessary notifications may require referencing a single decoded index value from a set of indices.

Since the example given in the preceding section does not decode the varbind indices, it does not work when the unique varbind in each SNMP notification has a different number, or order, of indices. A more complicated example of indexing can be found in the Cisco ITP MIBs. For instance, the following SNMP notifications contain varbinds from tables with many different index(es), but all have "cgspInstNetwork" in common as one index: ciscoGrtMgmtStateChangeRev1, ciscoGrtDestStateChangeRev1, ciscoGsccpGttMapStateChange, ciscoItpDsmrUcpSessionState, ciscoItpDsmrSmppSessionState. In addition to that index value, various other varbind values from the same notification would need to be used in coordination for correlation. This could be done to limit the number of open events, based on end user technical and business processes.

The simple correlation case also does not work when trying to correlate using the decoded varbind index value of one SNMP notification, and the varbind value of another SNMP notification. For example, attempting to correlate similar events, such as ceAlarmAsserted [CISCO-ENTITY-ALARM-MIB] where varbinds are from a table indexed using ceAlarmHistIndex, but contains entPhysicalIndex as the first varbind value, and entSensorThresholdNotification [CISCO-ENTITY-SENSOR-MIB/RFC3433] uses entPhysicalIndex as a varbind index value (or StateOperDisabled [RFC4268] where varbinds indexed by entPhysicalIndex).

To implement most types of complicated event correlation, most NMS require custom programmatic code to be written, instead of letting the user simply configure the relationships. This makes it much more difficult for non-expert users to add many types of event correlation. Further, in some cases only the NMS vendor can create the customized code. In an embodiment as described herein, a configuration mechanism has a graphical user interface (GUI) that allows a high degree of customization without requiring the overhead of learning a programmatic language, or setting up a required compile environment.

3.0 Using Decoded Varbind Index Data in NMS Functions

FIG. 1 illustrates a network management system and related logic. In an embodiment, a network management computer 102 is coupled to a storage unit 116 and one or more networks 114. Network management computer 102 may be a personal computer, workstation, server, or other computer. Network management computer 102 comprises event processing logic 108 having an SNMP manager 126 that is configured to implement SNMP functions in conformance to SNMP protocol definitions and RFCs. The event processing logic 108 is configured to execute network management system operations and may comprise a commercial NMS. In one embodiment, event processing logic 108 comprises Cisco Mobile Wireless Transport Manager (MWTM), commercially available from Cisco Systems, Inc., San Jose, Calif.

MIB compiler logic 106 is configured to compile one or more SNMP MIB definition files 104 into compiled data that is stored in storage unit 116 using the techniques that are further described herein.

A client computer 120 is coupled to network management computer 102 directly or indirectly through one or more local area networks, wide area networks, or internetworks. Client computer 120 may comprise a personal computer, laptop or notebook computer, workstation, or other computer. Client computer 120 is coupled to a display unit that is capable of displaying a graphical user interface 124 that is generated by the client computer either directly or based on data received from network management computer 102. In an embodiment, network management computer 102 includes an HTTP server, client computer 120 includes a browser, and the GUI 124 is rendered in the browser based on HTML documents or other data received from the network management computer. The SNMP MIB definition file 104 may be accessible to the client computer 120. In an embodiment, the graphical user interface is provided in the form of an Event Editor application 121 comprising a stand-alone client-side application that does not require use of a browser.

Storage unit 116 stores data files including an SNMP MIB definition file 104, a compiled MIB file 118, and one or more NMS configuration files 119. Each of the files 104, 118, 119 may represent a plurality of related files, blocks, or other data elements. Each of the files 104, 118, 119 may have a different file format or the same format.

Network 114 comprises one or more local area networks, wide area networks, internetworks, or a combination thereof. At least one networking device 130 is coupled to network 114. Networking device 130 broadly represents any number of routers, switches, or other internetworking devices that may form network 114 or participate in the network. One or more of the networking devices 130 is a managed networking device comprising an SNMP agent 132. Networking device 130 may store data values relating to internetworking operations in one or more MIBs in storage in the networking device. Networking device 130 may act as a source of notifications, events, or other notifications resulting from operation of the device or related devices.

As an overview of operation, in an embodiment, a MIB compiler gathers the following information from the specified SNMP MIBs about each SNMP Notification notification varbind information and columnar index information. This varbind index information is compiled into an intermediate format and stored. For purposes of clarity, the compiled MIB file 118 is used for the stored information.

In an embodiment, a GUI-based configuration utility, depicted in FIG. 1 as Event Editor 121, is provided to assist a NMS program developer or other user in specifying the NMS Event description that the end user will see in operation of the NMS, and to set up NMS event correlation rules. In an embodiment, the Event Editor 121 communicates with server-side components that may be integrated into MIB compiler logic 106 or SNMP notification configuration logic 110, or is hosted as an independent application or logic element in computer 102. The Event Editor 121 reads the compiled MIB file 118, and uses the information contained to populate various combo boxes and other GUI widgets. This information then can be used to set the NMS Event description and event correlation rules, or used in notification-event filter criteria. This user defined information is then written into the NMS configuration file 119.

The NMS reads both files 118, 119 upon startup, to configure itself to perform SNMP notification processing. The activity of creating files in both the MIB compiled format of file 118 and the user-defined format of configuration file 119 is performed whenever a new SNMP notification type or NMS Event type is added to an updated version of the NMS.

SNMP notifications may be logged and available for view by Event Log 123 as indicated by arrow 127.

Figure 2:
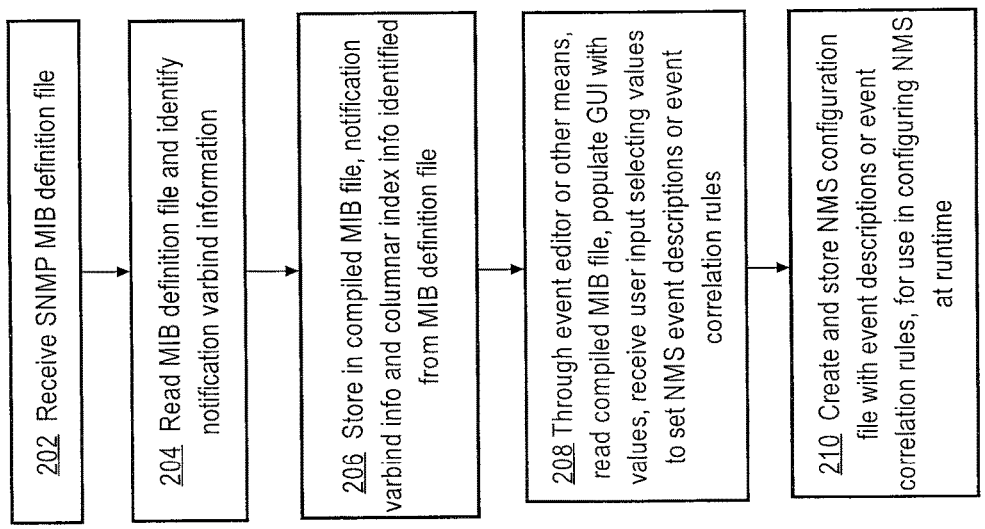
FIG. 2 illustrates compiling MIB definition files and user input, into compiled MIB files and NMS config files.

FIG. 2 illustrates compiling MIB definition files and user input into compiled MIB files and NMS config files. For purposes of illustrating a clear example, FIG. 2 is described in the context of FIG. 1. However, the broad approach represented in FIG. 2 may be practiced in other contexts.

In step 202, an SNMP MIB definition file is received. For example, MIB compiler logic 106 of the network management computer reads or otherwise receives one of the SNMP MIB definition files 104. In step 204, the MIB definition file is read notification varbind info and columnar index info are identified. In an embodiment, step 204 involves reading the MIB definition file to identify all notification records, and for each notification record an ordered list of all varbinds, including: object textual name, Object Identifier (OID), and etc. Step 204 may also identify notification columnar index info, including an ordered list of table indices, and for each index the index textual name, index type, index allowed length (to determine whether it is fixed length or not), and the index "implied" encoding value.

In step 206, a compiled MIB file is created based on the identified data. In an embodiment, step 206 involves storing in a compiled MIB file the notification varbind info and columnar index info identified from MIB definition file in step 204.

For example, MIB compiler logic 106 compiles the MIB definition file 104 into compiled MIB file 118 and includes the stated data in the compiled MIB file. In one specific embodiment, compilation involves storing the following information about each SNMP notification varbind info and columnar index info.

In step 208, through the event editor 121 or other means, the process reads the compiled MIB file, populates a GUI with values obtained from the compiled MIB file, and receives user input selecting values to set one or more NMS event descriptions in SNMP notification configuration functions or names of variables in event correlation rules or functions. In step 210, the process creates and stores a NMS configuration file with the event descriptions or event correlation rules, for use in configuring the NMS at runtime. Step 210 represents creating or writing, at some point before the decoded SNMP varbind index information is used in network management functions, configuration data or instructions that can use the decoded values for various purposes. For example, event processing logic 108 may decode index values, using index specific information provided by Compiled MIB file 118, and use SNMP notification configuration logic 119, for substitution into the definitions of notifications, events or other notifications, in the manner further described herein.

In one specific embodiment, a GUI-based Event Editor 121 is used to configure the following for each SNMP notification type, and the information is stored into one of the NMS configuration files 119:

a. Event short description or event name, which may display the decoded value of one or more varbind indices.

b. Event correlation rules, which may include a specific index value of one or more varbinds, even in the case where only a subset of varbind values or indices are used.

The event processing logic 108, which processes incoming SNMP notifications, reads the compiled MIB file 118 and the NMS event configuration file 119 upon startup to manage corresponding NMS event objects.

Figure 3:
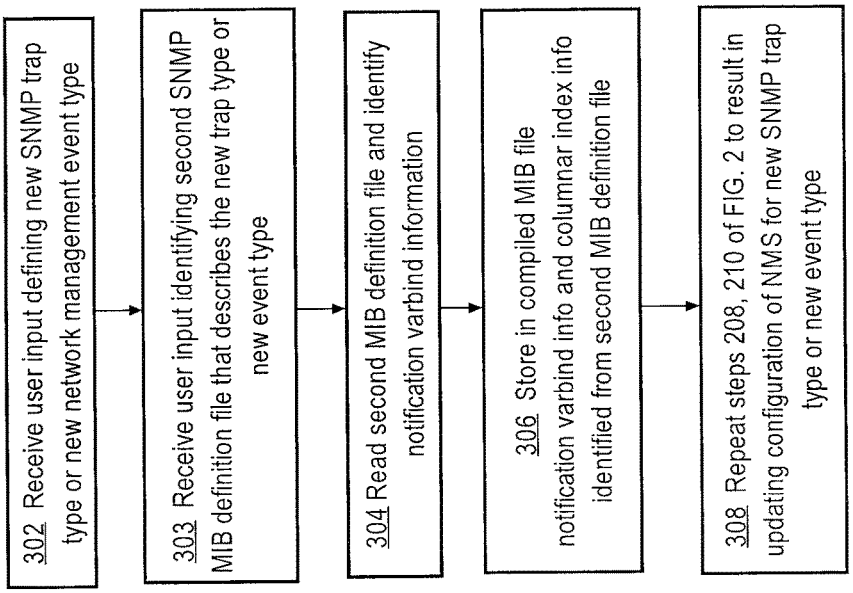
FIG. 3 illustrates iteratively compiling MIB definition files and user input, into compiled MIB files and NMS config files, for use with newly defined notifications or events.

The foregoing process may be repeated when new SNMP MIBs, SNMP notification types or new network management event types are required. FIG. 3 illustrates compiling MIB definition information into a compiled MIB file for use with newly defined notifications or events. In step 302, user input is received that defines a new SNMP notification type or a new network management event type. For example, an administrative user might manipulate the Event Editor 121 via GUI 124, to select a function for defining a new event type. In step 303, user input is received identifying a second SNMP MIB definition file that describes the new notification type or new event type. For example, the user might initiate a File Open dialog that identifies a name and storage location of SNMP MIB definition file 104. Alternatively, the name and location of the MIB definition file 104 may be obtained from a configuration file without user input at step 303.

In step 304 and step 306, the second MIB definition is read and compiled into compiled MIB files in the manner described above for step 204 and 206. In an embodiment, step 304 involves reading the second MIB definition file, and identifying the following notification varbind info: all notifications; for each notification an ordered list of all varbinds, including: object textual name, Object Identifier (OID), etc. Step 304 also involves identifying notification columnar index info. For each columnar varbind, the process identifies an ordered list of table indices, and for each index: index textual name, index type, index allowed length (to determine fixed length or not), index "implied" encoding yes/no values. In an embodiment, step 306 involves storing in the compiled MIB file notification varbind info and columnar index info that was identified from the second MIB definition file.

In step 308, steps 208, 210 of FIG. 2 may be repeated to result in creating and storing an updated NMS configuration file to include and use the new SNMP notification type or new event type in SNMP notification configuration functions with the NMS at runtime. Use in NMS event configuration functions is merely one example of an area of utility; other areas include correlation keys and notification-event filter criteria. NMS event filter criteria are the information in a notification at runtime that are matched by the NMS event definition at runtime to create a specific event in a NMS event history table.

Figure 4:
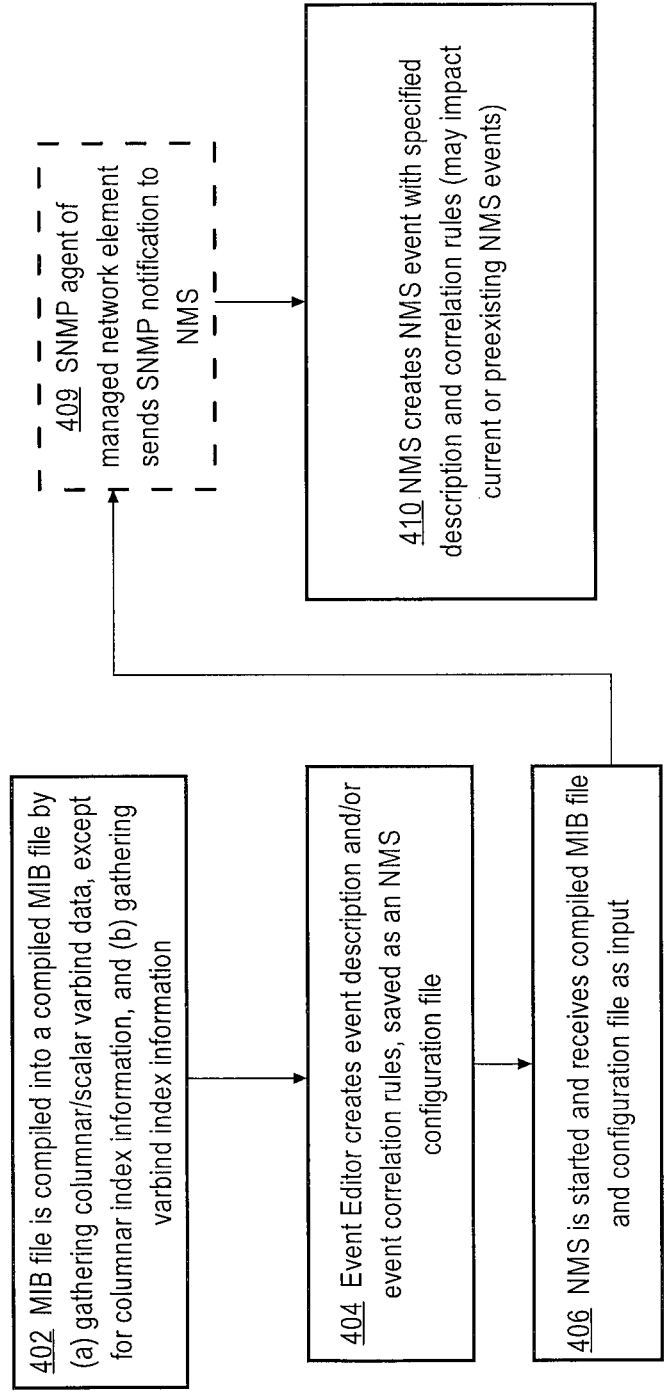
FIG. 4 illustrates using decoded index data in configuring event descriptions and event correlations in a NMS.
Figure 5:
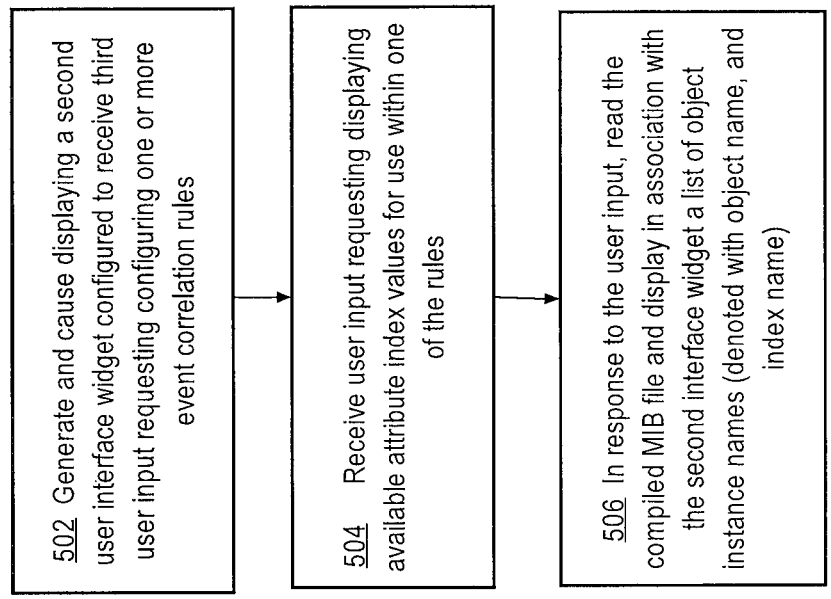
FIG. 5 illustrates an approach to update event correlation rules with available values.
Figure 6:
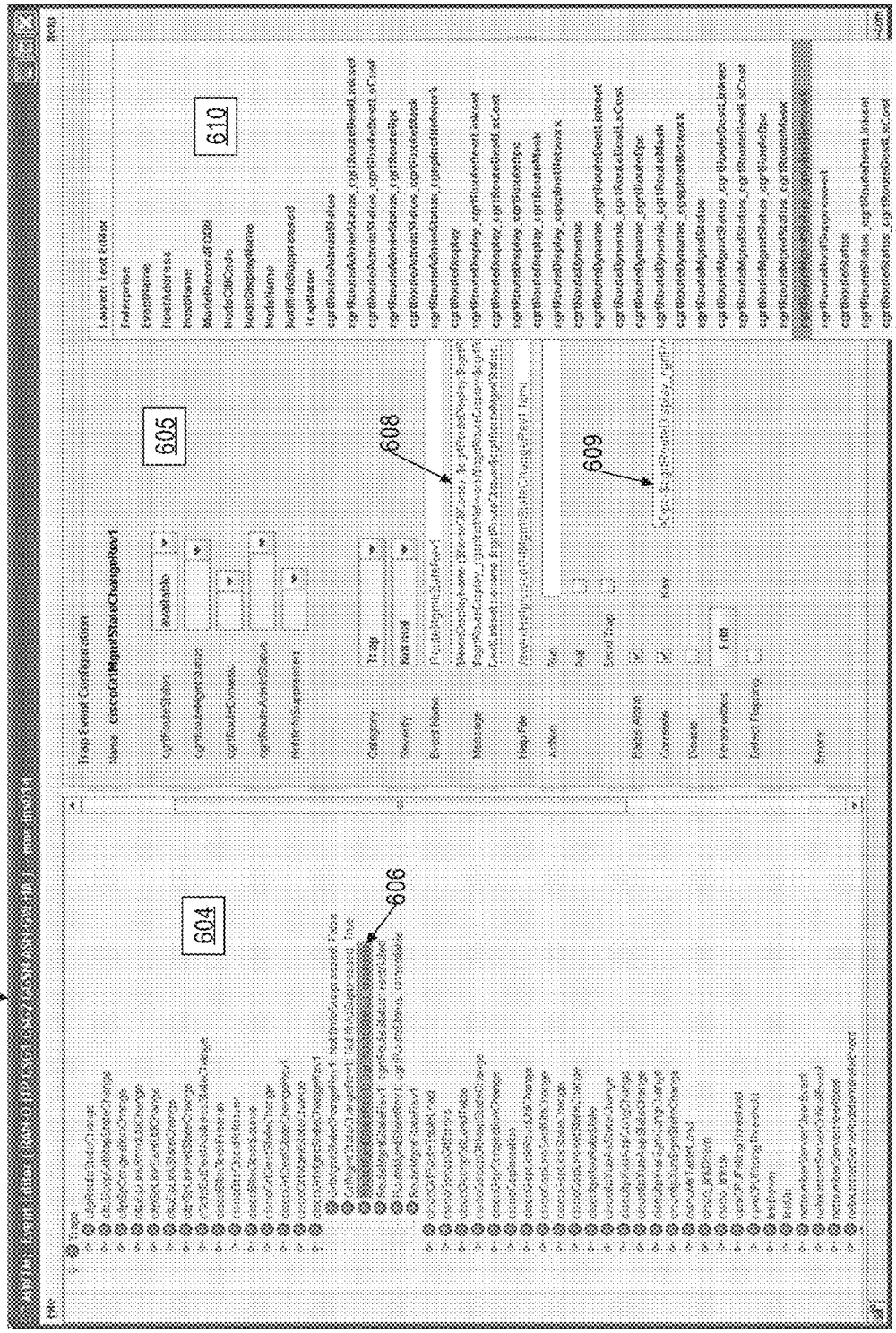
FIG. 6 is a screen display diagram showing using decoded index data for substitution into descriptions of SNMP notifications and events.

Once the MIB definition files 104 are compiled as indicated and data relating to encoded index varbinds is stored as specified, the stored decoded data may be used in a NMS in various ways that are now described. FIG. 4 illustrates using decoded index data in configuring event descriptions in a NMS; FIG. 5 illustrates using decoded index data in event correlation rules in a NMS; FIG. 6 is a screen display diagram showing using decoded index data for substitution into descriptions of NMS events that are created when SNMP notifications are received.

Referring first to FIG. 4, in step 402, the process creates a compiled MIB file using the two-part process previously described. In particular, columnar/scalar varbind data is gathered, except for columnar index information, and varbind index information is gathered. At step 404, the Event Editor creates an event description and/or one or more event correlation rules, which are saved as part of an NMS configuration file.

At step 406, the NMS is started and receives, as input, the compiled MIB file that was created at step 402 and the configuration file containing an event description or event correlation rules from step 404. Thus, step 406 represents an initiation of a runtime phase of the approaches described herein whereas prior steps are associated with compilation and configuration.

Assume at some point thereafter the SNMP agent of a managed network element sends an SNMP notification to the NMS, as seen at step 409. In response, the NMS creates an NMS event using the specified event description and event correlation rules. The event correlation rules also may impact current or preexisting NMS events.

These operations may occur in conjunction with user manipulation of the GUI generated by the event editor 121. For example, in step 404, the process generates and causes displaying a GUI widget to receive a selection of an event description function. For example, the SNMP Trap Configuration Logic 110 might generate and cause displaying a screen that contains a graphical text data entry field or other widget that can receive a description of a network management event. The user might select the field and begin to enter a description of an event in the field.

A specific example of compilation and use is now provided. In an embodiment, the text in Table 1 represents example output from MIB compiler logic 106, and describes the structure of a particular notification.

Table 1

Example Notification Structure Description

The cSctpExtDestAddressStateChange and ciscoItpXuaAspDestAddrStateChange notifications are implemented in products from Cisco Systems. They are sent to a NMS station when an stream control transport protocol (SCTP) destination IP address used by an "SS7 application server process" changes state. A NMS may correlate these events together to represent a single alarm. The difference between these two notifications is that the key information needed for event correlation is contained in the cSctpExtDestAddressStateChange varbind instance information as opposed to the ciscoItpXuaAspDestAddrStateChange varbind value information. In an embodiment, the varbind instance information may be presented in the cSctpExtDestAddressStateChange notification as substitution variables that can be accessed and manipulated with a graphical user interface to construct event message text and correlation relationships. This approach provides improved ease of use that saves the time of both developers and end-users. The following information in these two notifications is needed to correlate the events.
Agent address
SCTP association id
SCTP Remote address During system configuration the correlation key for each event is defined so that at runtime the two keys resolve to the same value.
MWTM Correlation Key Definition:
DestinationAddressStateChange-$AgentAddress-$SCTPAssociationId-$RemoteAddress
MWTM Correlation Key at Runtime:
DestinationAddressStateChange-172.18.17.44-8585535-172.18.17.190
cSctpExtDestAddressStateChange
Simple Network Management Protocol
Version: 1 (0)
Community: jtwiddy
PDU type: TRAP-V1 (4)
Enterprise: 1.3.6.1.4.1.9.10.76 (CISCO-IETF-SCTP-EXT-MIB::cSctpExtMIB)
Agent Address: 172.18.17.44 (172.18.17.44)
Trap Type: ENTERPRISE SPECIFIC (6)
Specific Trap Type: 1
Timestamp: 432270682
Object Identifier 1: 1.3.6.1.4.1.9.10.75.1.2.4.1.3.8585535.1.4.172.18.17.190 (CISCO-IETF-SCTP-MIB::cSctpAssocRemAddressStatus.8585535.ipv4. "172.18.17.190")
Value: INTEGER: inactive (1)
ciscoItpXuaAspDestAddrStateChange
Simple Network Management Protocol
Version: 1 (0)
Community: jtwiddy
PDU Type: TRAP-V1 (4)
Enterprise: 1.3.6.1.4.1.9.9.253 (CISCO-ITP-XUA-MIB::ciscoItpXuaMIB)
Agent Address: 172.18.17.44 (172.18.17.44)
Trap Type: ENTERPRISE SPECIFIC (6)
Specific Trap Type: 7
Timestamp: 432270682
Object Identifier 1: 1.3.6.1.4.1.9.9.232.1.1.2.0 (CISCO-ITP-SP-MIB::cItpSpCLLICode.0)
Value: STRING: "clli_7392k"
Object Identifier 2: 1.3.6.1.4.1.9.9.253.1.10.2.0 (CISCO-ITP-XUA-MIB::cItpXuaAspDisplayName.0)
Value: STRING: "asp440_620-1"
Object Identifier 3: 1.3.6.1.4.1.9.9.253.1.5.1.1.13.12.97.115.112.52.52.48.95.54.50.48.45.49 (CISCO-ITP-XUA-MIB::cItpXuaAspAssocIdU32."asp440_620-1")
Value: Gauge32: 8585535
Object Identifier 4: 1.3.6.1.4.1.9.9.253.1.6.1.1.3.12.97.115.112.52.52.48.95.54.50.48.45.49.2 (CISCO-ITP-XUA-MIB::cItpXuaAspRemoteIpAddr."asp440_620-1".2)
Value: IpAddress: 172.18.17.190
Object Identifier 5: 1.3.6.1.4.1.9.9.253.1.6.1.1.5.12.97.115.112.52.52.48.95.54.50.48.45.49.2 (CISCO-ITP-XUA-MIB::cItpXuaAspRemoteIpTableEntry.".asp4".52.48.95.54.50.48.45.49.2)
Value: Gauge32: 2

In an embodiment, the data obtained from the trap properties file and the trap indices properties file allows event editor 121 to display index names. The event editor 121 may comprise a client-side, Java-based application and may have server-side components that form a component of SNMP notification configuration logic 110 or may comprise an independent logical element hosted in network management computer 102.

Thus, in an embodiment the compilation process performs:
1. For each MIB file:
2. Identify each SNMP notification (aka SNMP trap)
3. For each SNMP notification:
4. Identify the ordered notification varbinds
5. For each notification varbind, identify and store notification varbind info
6. Identify the varbind instance information. There is no additional processing required for scalar objects. For columnar types, identify and store notification columnar index info. Decoding all columnar object indices first requires knowing the ordered list of all indices. Decoding each columnar object index at runtime requires: index type, allowed length, and implied encoding. Referencing a specific columnar object index in the Event Editor requires the combination of columnar object name, and columnar object index name.

The MIB compilation process is performed before prior to runtime.

NMS products use a mib compiler to transform the complex mib syntax in to a simpler format. This saves development cost by leveraging existing code to parse the mibs. The mib compiler may output a file that contains less information than the mibs Referring now to FIG. 6, in an embodiment, a screen display 602 comprises a notification list 604, notification event configuration panel 605, and user invoked pop-up list 610. Notification list 604 comprises a list of existing notifications by name. Notifications may be organized hierarchically according to the nature of the notifications. In an embodiment, when the event editor 121 receives user input selecting a particular event 606, in response, the event editor 121 causes displaying detailed configuration data relating to the selected event in configuration panel 605. In an embodiment, certain configuration fields are structured using substitution string values that can take any of a plurality of parameter values. In the example of FIG. 6, the user has selected a particular event created when the ciscoGrtMgmt-StateChangeRev1 notification is received by the NMS.

For example, message field 608 is structured to display an information message in a screen display of the NMS when the selected notification occurs. In an embodiment, when the event editor 121 receives user input indicating a special selection of a field with substitution string variables—such as a user right clicking a button of a pointing device while pointing a cursor at the field—then in response, the event editor 121 causes displaying a list of all known index names in pop-up list 610. The user may then select a particular index name for substitution. The inserted index name will be substituted with the actual index value upon NMS event creation at runtime. As a result, operation of the computer is improved and more flexible because the user has access to index names, which will represent the parsed and decoded index value to use upon receiving a SNMP Notification at runtime. Both the index name to reference future index value(s), and the compiled MIB data necessary to parse and decode the index value from a specific SNMP Notification at runtime have been unavailable in previous approaches.

FIG. 6 illustrates using varbind index names to establish event correlation rules, and NMS event descriptions. In FIG. 6, both the "Correlate" field 609, and the NMS event description field 608, allow input of the varbind index names for later use by Event Processing Logic 108.

Referring now to FIG. 5, in step 502, a process generates and causes displaying a second user interface widget that is configured to receive third user input requesting configuring one or more event correlation rules. For example, a user selects a GUI widget in the user interface generated by SNMP Trap Configuration Logic 110 that is associated with configuring event correlation rules. A display of existing rules might be displayed or a user input screen for entering data relating to a new correlation rule might be displayed.

In step 504, user input is received requesting displaying available object index values for use within one of the rules. For example, a user might begin composing a rule, or load a template for a rule, and at a certain point the user may need to specify a columnar object instance as a value for correlation. Therefore, the user might right-click on the rule, or on a substitution variable in the rule, or otherwise indicate a request to view a list of available object index values.

In step 506, in response to the user input, the process reads the compiled MIB file and displays, in association with the second interface widget, a list of object instance names (denoted with object name, and index name).

For example, SNMP Trap Configuration Logic 110 might display a pop-up menu or other list of known object instance values and display the list in the GUI in a position near to the data entry field that the user is manipulating.

Accordingly, a NMS user can modify NMS event descriptions and event correlation, via a non-programmatic method involving manipulation of GUI widgets. As a result, a user can achieve configurable event description and correlation between SNMP notifications with multiple, disjointed index sets. The benefit provided in the disclosed system is not available in other NMS. For example, many NMS only allow for correlation based on a unique varbind (such as name and all indices) shared between the two SNMP notification types, whereas there are many examples which require more flexible functionality, such as an object in each SNMP notification which has a different set of indices or values. Consequently, the disclosed mechanisms provide a useful and new way for a notification receiver to be flexibly programmed to decode index information, and to specify correlation across notifications based on subsets of the presented information.

The described approaches provide improvements at compilation, configuration, and runtime phases. At MIB compilation, the approaches focus on obtaining (a) an ordered list of index(es) per columnar varbind, and per each index: (b) index name; (c) index type; (d) allowable range; (e) implied encoding. In an embodiment, iteratively adding a new NMS event type may be accomplished by performing or repeating the compilation and configuration of an event description and/or event correlation tag, plus some additional configuration data, as described above, optionally using an Event Editor, after which the NMS rereads updated configuration files. Event descriptions can be configured before runtime to contain the index value decoded from SNMP trap/notification varbind OID (which is obtained during runtime). Event correlation can be configured (pre-runtime) to use the index value decoded from SNMP trap/notification varbind OID (obtained during runtime), and this value can be compared against any other in a SNMP trap/notification, including header info, varbind index value, or varbind value. The Event Editor references a certain columnar object index using a combination of the columnar object MIB name, and the index object MIB name.

In various embodiments, as detailed above, a GUI drop-down box is used to define event descriptions and correlations, not custom code. Using the Event Editor (GUI) does not require the operator to know any special configuration file or custom code syntax. Even if an Event Editor is not used, the approaches use a configuration file to define event descriptions and correlations, rather than custom code.

At runtime, varbind index values from an SNMP trap or notification can be decoded and the value inserted into an event description, based upon a predefined NMS configuration. The varbind index values from an SNMP trap or notification can be decoded and the value used for the purpose of event correlation, based upon predefined NMS configuration.

4.0 Implementation Mechanisms

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
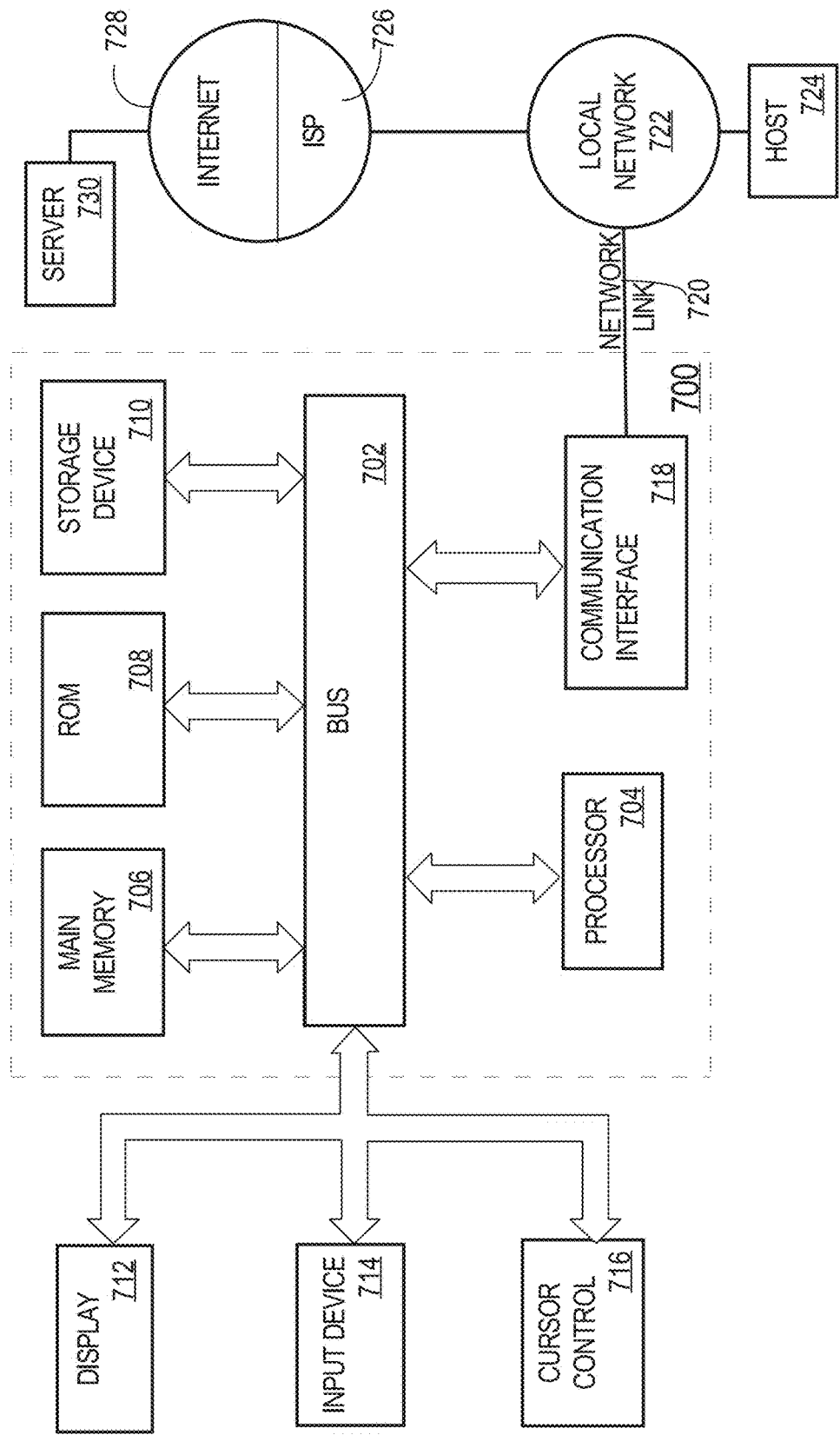
FIG. 7 illustrates a computer system upon which an embodiment may be implemented

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

5.0 Extensions and Alternatives

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A computer-implemented method, comprising:
   receiving, from a networking device at a network management computer, a Simple Network Management Protocol (SNMP) notification comprising a columnar varbind that includes one or more varbind indices and corresponding one or more index values and in response thereto automatically performing:
   using event processing logic at the network management computer, decoding the one or more varbind indices into corresponding one or more index textual names based on compiled Management Information Base (MIB) data that comprises information from one or more MIB definition files that define the one or more varbind indices and the corresponding one or more index textual names;
   using the event processing logic, retrieving one or more event descriptions from network management system event configuration data;
   using the event processing logic, comparing the one or more MIB defined index textual names from the compiled MIB data to one or more substitution variables in the one or more event descriptions to identify, from the one or more MIB defined index textual names, a MIB defined index textual name that corresponds to a substitution variable from the one or more substitution variables in the one or more event descriptions;
   using the event processing logic, based on comparing the one or more MIB defined index textual names from the compiled MIB data to the one or more substitution variables in the one or more event descriptions, replacing the substitution variable with a particular value based on a varbind index value of the one or more varbind index values from the received SNMP notification, wherein the varbind index value corresponds to a varbind index which corresponds to the identified MIB defined index textual name from the compiled MIB data;
   using the event processing logic, constructing a message based on the one or more event descriptions and the particular value that replaced the substitution variable in the one or more event descriptions.

2. The method of claim 1 wherein the compiled MIB data further comprises a columnar object identifier and a columnar object textual name.

3. The method of claim 1 wherein the compiled MIB data comprises at least one of: an allowable index range of the one or more varbind indices, an implied index encoding of the one or more varbind indices, or an index type of the one or more varbind indices.

4. The method of claim 1 further comprising, prior to receiving the SNMP notification, using MIB compiler logic at the network management computer, compiling the one or more MIB definition files into the compiled MIB data including storing into the compiled MIB data, for the one or more varbind indices, at least one of: an allowable index range of the one or more varbind indices, an implied index encoding of the one or more varbind indices, or an index type of the one or more varbind indices.

5. The method of claim 1 wherein decoding the one or more varbind indices into the corresponding one or more index textual names comprises parsing the one or more varbind indices from one or more object identifiers of the columnar varbind.

6. The method of claim 5 wherein decoding the one or more varbind indices into the corresponding one or more index textual names comprises reading from the compiled MIB data at least one of: an allowable index range of the one or more varbind indices, an implied index encoding of the one or more varbind indices, or an index type of the one or more varbind indices.

7. The method of claim 1 further comprising:
   receiving, at the network management computer, a second SNMP notification comprising a second columnar varbind that includes a second plurality of varbind indices and corresponding index values;
   using the event processing logic at the network management computer, decoding one or more second varbind indices, from the second plurality of varbind indices and corresponding index values, into corresponding one or more second index textual names based on the compiled MIB data;
   using the event processing logic, comparing correlation variables in event correlation rule data with the one or more index textual names and with the one or more second index textual names;
   using the event processing logic, based on comparing the correlation variables in the event correlation rule data with the one or more index textual names and with the one or more second index textual names, retrieving particular event correlation rule data;
   using the event processing logic, based on the varbind index value from the SNMP notification and a second varbind index value, from the second columnar varbind of the second SNMP notification, corresponding to a second varbind index, of the one or more second varbind indices, which corresponds to the second index textual name, determining that the SNMP notification is correlated with the second SNMP notification.

8. The method of claim 7 wherein determining that the SNMP notification is correlated with the second SNMP notification further comprises:
constructing, based on the particular event correlation rule data, a first key value, by substituting one or more correlation variables of the particular event correlation rule data with the varbind index value from the columnar varbind;
constructing, based on the particular event correlation rule data, a second key value, by substituting the one or more correlation variables of the particular event correlation rule data with the second varbind index value from the second columnar varbind;
comparing the first key value and the second key value.

9. The method of claim 7 wherein comparing the correlation variables in the event correlation rule data with the one or more index textual names and with the one or more second index textual names is performed using notification filter criteria.

10. The method of claim 7 wherein the event correlation rule data is stored in a Network Management System (NMS) configuration file.

11. A non-transitory computer-readable data storage medium storing one or more sequences of instructions which, when executed by one or more processors, cause:
receiving, from a networking device at a network management computer, a Simple Network Management Protocol (SNMP) notification comprising a columnar varbind that includes one or more varbind indices and corresponding one or more index values and in response thereto automatically performing:
using event processing logic at the network management computer, decoding the one or more varbind indices into corresponding one or more index textual names based on compiled Management Information Base (MIB) data that comprises information from one or more MIB definition files that define the one or more varbind indices and the corresponding one or more index textual names;
using the event processing logic, retrieving one or more event descriptions from network management system event configuration data;
using the event processing logic, comparing the one or more MIB defined index textual names from the compiled MIB data to one or more substitution variables in the one or more event descriptions to identify, from the one or more MIB defined index textual names, a MIB defined index textual name that corresponds to a substitution variable from the one or more substitution variables in the one or more event descriptions;
using the event processing logic, based on comparing the one or more MIB defined index textual names from the compiled MIB data to the one or more substitution variables in the one or more event descriptions, replacing the substitution variable with a particular value based on a varbind index value of the one or more varbind index values from the received SNMP notification, wherein the varbind index value corresponds to a varbind index which corresponds to the identified MIB defined index textual name from the compiled MIB data;
using the event processing logic, constructing a message based on the one or more event descriptions and the particular value that replaced the substitution variable in the one or more event descriptions.

12. The non-transitory computer-readable data storage medium of claim 11 wherein the compiled MIB data further comprises a columnar object identifier and a columnar object textual name.

13. The non-transitory computer-readable data storage medium of claim 11 wherein the compiled MIB data comprises at least one of: an allowable index range of the one or more varbind indices, an implied index encoding of the one or more varbind indices, or an index type of the one or more varbind indices.

14. The non-transitory computer-readable data storage medium of claim 11 wherein the one or more sequences of instructions comprise instructions which, when executed by the one or more processors, cause:
prior to receiving the SNMP notification, using MIB compiler logic at the network management computer, compiling the one or more MIB definition files into the compiled MIB data including storing into the compiled MIB data, for the one or more varbind indices, at least one of: an allowable index range of the one or more varbind indices, an implied index encoding of the one or more varbind indices, or an index type of the one or more varbind indices.

15. The non-transitory computer-readable data storage medium of claim 11 wherein instructions that cause decoding the one or more varbind indices into the corresponding one or more index textual names, cause parsing the one or more varbind indices from one or more object identifiers of the columnar varbind.

16. The non-transitory computer-readable data storage medium of claim 15 wherein instructions that cause decoding the one or more varbind indices into the corresponding one or more index textual names, cause reading from the compiled MIB data at least one of: an allowable index range of the one or more varbind indices, an implied index encoding of the one or more varbind indices, or an index type of the one or more varbind indices.

17. The non-transitory computer-readable data storage medium of claim 11 wherein the one or more sequences of instructions comprise instructions which, when executed by the one or more processors, cause:
receiving, at the network management computer, a second SNMP notification comprising a second columnar varbind that includes a second plurality of varbind indices and corresponding index values;
using the event processing logic at the network management computer, decoding one or more second varbind indices, from the second plurality of varbind indices and corresponding index values, into corresponding one or more second index textual names based on the compiled MIB data;
using the event processing logic, comparing correlation variables in event correlation rule data with the one or more index textual names and with the one or more second index textual names;
using the event processing logic, based on comparing the correlation variables in the event correlation rule data with the one or more index textual names and with the one or more second index textual names, retrieving particular event correlation rule data;
using the event processing logic, based on the varbind index value from the SNMP notification and a second varbind index value, from the second columnar varbind of the second SNMP notification, corresponding to a second varbind index, of the one or more second varbind indices, which corresponds to the second index textual name, determining that the SNMP notification is correlated with the second SNMP notification.

18. The non-transitory computer-readable data storage medium of claim 17, wherein the one or more sequences of instructions comprise instructions which, when executed by the one or more processors, cause:
- constructing, based on the particular event correlation rule data, a first key value, by substituting one or more correlation variables of the particular event correlation rule data with the varbind index value from the columnar varbind;
- constructing, based on the particular event correlation rule data, a second key value, by substituting the one or more correlation variables of the particular event correlation rule data with the second varbind index value from the second columnar varbind;
- comparing the first key value and the second key value.

19. The non-transitory computer-readable data storage medium of claim 17 wherein instructions that cause comparing the correlation variables in the event correlation rule data with the one or more index textual names and with the one or more second index textual names cause using notification filter criteria.

20. The non-transitory computer-readable data storage medium of claim 17 wherein the event correlation rule data is stored in a Network Management System (NMS) configuration file.

* * * * *